(12) United States Patent
Wake et al.

(10) Patent No.: US 8,647,782 B2
(45) Date of Patent: Feb. 11, 2014

(54) FUEL CELL SYSTEM AND CONTROL METHOD THEREOF

(75) Inventors: Chihiro Wake, Saitama (JP); Yuji Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 79 days.

(21) Appl. No.: 13/478,159

(22) Filed: May 23, 2012

(65) Prior Publication Data

US 2012/0301804 A1   Nov. 29, 2012

(30) Foreign Application Priority Data

May 25, 2011 (JP) ................................. 2011-117146

(51) Int. Cl.
*H01M 8/04* (2006.01)

(52) U.S. Cl.
USPC ........... 429/428; 429/400; 429/407; 429/427; 429/429; 429/430; 429/431; 429/432

(58) Field of Classification Search
USPC .................. 429/400, 407, 427–432
See application file for complete search history.

(56) References Cited

FOREIGN PATENT DOCUMENTS

JP    2006-294304 A    10/2006

*Primary Examiner* — Patrick Ryan
*Assistant Examiner* — Ben Lewis
(74) *Attorney, Agent, or Firm* — Squire Sanders (US) LLP

(57) ABSTRACT

A fuel cell system is provided that can establish, for a long time period, a stack to an idling stop state. The fuel cell system includes: an idling stop control means for setting the stack to an idling stop state by, decreasing both a supplied amount of air to the stack and generated electric current produced from the stack to less than during the idling power generation; and a discharge valve control means for determining whether there is a necessity to discharge nitrogen or generated water inside of the anode system, and for opening the purge valve or drain valve in a case of there being a necessity. The discharge valve control means shortens valve open times (PO2, DO2) of the purge valve and drain valve during idling stop to less than the valve open times (PO1, DO1) thereof during idling power generation.

13 Claims, 13 Drawing Sheets

FUEL CELL SYSTEM AND CONTROL METHOD THEREOF

This application is based on and claims the benefit of priority from Japanese Patent Application No. 2011-117146, filed on 25 May 2011, the content of which is incorporated herein by reference.

BACKGROUND OF THE INVENTION

1. Field of the Invention

The present invention relates to a fuel cell system and a control method thereof.

2. Related Art

In recent years, fuel cell systems have received attention as a new source of power for automobiles. Fuel cell systems are provided with a fuel cell stack that generates power by allowing reactant gases (hydrogen and air) to undergo a chemical reaction, and reactant gas supply devices that supply reactant gases to the fuel cell via reactant gas channels, for example. The fuel cell stack is a stack structure in which from several tens to several hundreds of fuel cells are layered. In this regard, each fuel cell is configured by sandwiching a membrane electrode assembly (MEA) with a pair of separators, and the membrane electrode assembly is configured by the two electrodes of an anode and a cathode, and a solid polymer electrolyte membrane sandwiched by these electrodes.

In order to suppress the consumption amount of reactant gases as much as possible in a fuel cell vehicle with such a fuel cell system as the source of power, it is preferable to stop the supply of reactant gases to the fuel cell stack in a case of power generation being continually performed in an idle operation state such as while waiting at a traffic light, for example. Patent Document 1 proposes a technology to consume the hydrogen and oxygen staying in the fuel cell stack and system to prevent the fuel cell stack from being left as is in a high-voltage state, thereby suppressing degradation of the fuel cell stack, by continually producing generated electric current from the fuel cell stack, i.e. by continuing discharge of the fuel cell stack, even after stopping the supply of such reactant gases.

Patent Document 1: Japanese Unexamined Patent Application, Publication No. 2006-294304

SUMMARY OF THE INVENTION

However, if the supply of reactant gas is completely stopped as with the above-mentioned technology of Patent Document 1, the oxygen and hydrogen remaining in the vicinity of the MEA will react and the catalyst may deteriorate; therefore, it has been known to be preferable to continually supply even a slight amount of reactant gases also during idling stop. Therefore, by supplying reactant gas at low flowrate and continuing discharge during idling stop, it is possible to suppress both degradation due to the reaction of oxygen and hydrogen in the vicinity of the MEA, and degradation due to the fuel cell stack entering a high-voltage state.

However, when power generation is continued under the supply of low flowrates of reactant gases in this way, the cell voltage tends to decline since the nitrogen concentration tends to rise on the anode side due to crossover from the cathode side to the anode side, and so-called flooding in which the generated water from power generation accumulates in the channels of the reactant gas tends to occur. Since the stack may deteriorate if power generation is continued in a state in which the cell voltage is excessively low, it is necessary to increase the flowrate of reactant gas in order to suppress the progression of such deterioration in a case of the cell voltage having declined at least to some extent, and thus the idling stop state must be cancelled. As a result, it is difficult to establish the stack in the idling stop state over a long time period.

The present invention has an object of providing a fuel cell system that can establish, over a long time period, the stack in an idling stop state having little deterioration, and a control method thereof.

In order to achieve the above-mentioned object, the present invention provides a fuel cell system (e.g., the fuel cell system 1 described later) including: a fuel cell (e.g., the fuel cell stack 10 described later) that generates power when fuel gas is supplied to an anode and oxidant gas is supplied to a cathode; an electrical load (e.g., the high-voltage battery 16, motor 17 and air pump 21 described later) that consumes electric power generated by the fuel cell; an idling stop control means (e.g., the ECU 40 described later) for setting the fuel cell to an idling stop state by, in response to a predetermined condition being satisfied during idling power generation, decreasing both a supplied amount of oxidant gas to the fuel cell and generated electric current produced from the fuel cell to less than during the idling power generation, within a range greater than zero; a discharge valve (e.g., the purge valve 351 and drain valve 361 described later) provided in an anode system through which gas supplied to the anode and gas discharged from the anode flows; a dilution means (e.g., the diluter 50 described later) for diluting fuel gas discharged from inside the anode system by opening the discharge valve, with oxidant gas serving as a dilution gas; and a discharge valve control means for determining whether there is a necessity to discharge residue inside of the anode system during the idling power generation and during the idling stop, and for opening the discharge valve over a predetermined time period in a case of there being a necessity. The discharge valve control means shortens a valve open time (e.g., the valve open times PO2, DO2 in FIG. 10 described later) of the discharge valve during the idling stop to less than a valve open time (e.g., the valve open times PO1, DO1 in FIG. 10 described later) of the discharge valve during the idling power generation.

In the present invention, even during idling stop, it is determined that there is a necessity to discharge residue inside of the anode system similarly to during idling power generation, i.e. the substance that is the main factor causing the cell voltage to decline such as nitrogen and generated water from power generation, the discharge valve is opened over a predetermined time in a case of there being a necessity, and the fuel gas discharged along with the above-mentioned residue is diluted by the dilution gas. It is thereby possible to suppress a decline in cell voltage and to maintain the idling stop state over a long time period.

In addition, since oxidant gas is supplied in a low flowrate in idling stop compared to during idling power generation, the fuel gas dilution capability of the dilution means declines. In contrast, with the present invention, it is configured so that fuel gas of an amount exceeding the dilution capability is not introduced to the dilution means, by shortening the valve open time of the discharge valve during idling stop to less than during idling power generation. Therefore, according to the present invention, it is possible to sufficiently dilute fuel gas, while maintaining the idling stop state longer.

In this case, it is preferable for a time from closing until opening the discharge valve to be defined as a discharge interval, and the discharge valve control means to lengthen a discharge interval (e.g., the intervals PI2, DI2 in FIG. 10 described later) during the idling stop to longer than a discharge interval (e.g., the intervals PI1, DI1 in FIG. 10 described later) during the idling power generation.

With the present invention, it is possible to introduce a sufficient amount of dilution gas to the dilution means in a period since last closing the discharge valve until the present reopening thereof, by lengthening the discharge interval during idling stop to longer than during idling power generation.

In this case, it is preferable for the discharge valve control means to determine there is a necessity to discharge residue inside of the anode system in a case of either one or both of two conditions having been satisfied of an event of a predetermined time elapsing since closing the discharge valve and an event of an integrated value of generated electric current produced from the fuel cell becoming at least a predetermined value, and then to open the discharge valve.

The elapsed time since closing the discharge valve and the integrated value of the generated electric current of the fuel cell are considered to be roughly proportional to the integrated value of dilution gas newly introduced to the dilution means. Therefore, with the present invention, by opening the discharge valve in a case of either one or both of the above-mentioned two conditions having been satisfied, it is possible to open the discharge valve at an appropriate timing at which it can be determined that a sufficient amount of dilution gas has been introduced to the dilution means, even during idling stop, which supplies a low flowrate of oxidant gas.

In this case, it is preferable for a valve open time of the discharge valve during the idling stop to be set based on a generated electric current of the fuel cell during the idling stop.

The dilution capability by the dilution means has a correlation to the supplied amount of oxidant gas, and furthermore, the generated electric current of the fuel cell has a correlation to this supplied amount of oxidant gas; therefore, with the present invention, the valve open time of the discharge valve during idling stop is set based on the generated electric current of the fuel cell during idling stop. It is thereby possible to appropriately set the valve open time of the discharge valve during idling stop in accordance with the dilution capability of the dilution means.

In this case, it is preferable for the discharge valve to include at least any of a purge valve (e.g., the purge valve 351 described later) that mainly discharges a gaseous component of the residue inside of the anode system and a drain valve (e.g., the drain valve 361 described later) that mainly discharges a liquid component in the residue inside of the anode system.

As described above, a gaseous component such as nitrogen and a liquid component such as generated water from power generation are included in the residue that is the main factor causing the cell voltage of the fuel cell to decline during idling stop. With the present invention, it is possible to suppress a decline in the cell voltage caused by a rise in the nitrogen concentration, and to maintain the idling stop state longer, by opening and closing a purge valve for discharging a gaseous component for an appropriate valve open time and discharge interval such as those described above. In addition, it is possible to suppress a decline in the cell voltage caused by the occurrence of flooding and to maintain the idling stop state longer, by opening and closing a drain valve for discharging a liquid component for an appropriate valve open time and discharge interval such as those described above.

In order to achieve the above-mentioned object, the present invention provides a method for controlling a fuel cell system that includes: a fuel cell that generates power when fuel gas is supplied to an anode and oxidant gas is supplied to a cathode; an electrical load that consumes electric power generated by the fuel cell; a discharge valve provided in an anode system through which gas supplied to the anode and gas discharged from the anode flows; and a dilution means for diluting fuel gas discharged from inside of the anode system by opening the discharge valve, with oxidant gas as a dilution gas. The method for controlling includes: an idling power generation step of producing a predetermined amount of generated electric current from the fuel cell while supplying a predetermined amount of oxidant gas to the fuel cell; an idling stop step of producing less generated electric current from the fuel cell than during the idling power generation step, while supplying a smaller amount of oxidant gas to the fuel cell than during the idling power generation step, initiated in response to a predetermined condition having been established while executing the idling power generation step; and a discharge step of determining whether there is a necessity to discharge residue inside of the anode system during the idling power generation step and during the idling stop step, and opening the discharge valve over a predetermined time period in a case of there being a necessity, in which a valve open time of the discharge valve during the idling stop step is shortened to less than a valve open time of the discharge valve during the idling power generation step, in the discharge step.

In this case, it is preferable for a time from closing until opening the discharge valve to be defined as a discharge interval, and a discharge interval during the idling stop step to be lengthened to longer than a discharge interval during the idling power generation step, in the discharge step.

Furthermore, in this case, it is preferable for it to be determined in the discharge step that there is a necessity to discharge residue inside of the anode system in a case of either one or both of two conditions having been satisfied of an event of a predetermined time elapsing since closing the discharge valve and an event of an integrated value of generated electric current produced from the fuel cell becoming at least a predetermined value, and the discharge valve to be opened.

In addition, in this case, it is preferable for a valve open time of the discharge valve during the idling stop step to be set based on a generated electric current of the fuel cell during the idling stop step.

Moreover, in this case, it is preferable for the discharge valve to include at least any of a purge valve that mainly discharges a gaseous component of the residue inside of the anode system and a drain valve that mainly discharges a liquid component in the residue inside of the anode system.

The present invention exerts the same effects as the aforementioned fuel cell system.

In order to achieve the above-mentioned object, the present invention provides a fuel cell system including: a fuel cell that generates power when fuel gas is supplied to an anode and oxidant gas is supplied to a cathode; an electrical load that consumes electric power generated by the fuel cell; an idling stop control means for setting the fuel cell in an idling stop state by, in response to a predetermined condition being satisfied during idling power generation, decreasing both a supplied amount of oxidant gas to the fuel cell and generated electric current produced from the fuel cell to less than during the idling power generation, within a range greater than zero; a discharge valve provided in an anode system through which gas supplied to the anode and gas discharged from the anode flows; a dilution means for diluting fuel gas discharged from inside of the anode system by opening the discharge valve, with oxidant gas serving as a dilution gas; and a discharge valve control means for opening the discharge valve at a predetermined period over a predetermined time during the idling power generation, and for closing the discharge valve during the idling stop. The idling stop control means cancels the idling stop in response to a cell voltage of the fuel cell during the idling stop falling below a discharge valve open threshold corresponding to a cell voltage at which it can be determined that there is a necessity to open the discharge valve, and establishes a state of idling power generation, and the discharge valve open threshold is set to a value larger than a cell voltage at which it can be determined that deterioration of the fuel cell progresses.

With the present invention, the discharge valve is opened at a predetermined period over a predetermined time during idling power generation, and the discharge valve is closed during idling stop, which decreases both the supplied amount of oxidant gas to the fuel cell and the generated electric current produced from the fuel cell to less than during idling power generation, within a range larger than 0. In addition thereto, with the present invention, idling stop is cancelled and the idling power generation state is established again in response to the cell voltage of the stack during idling stop falling below the discharge valve open threshold corresponding to a cell voltage at which it can be determined that there is a necessity to open to the discharge valve. Furthermore, this discharge valve open threshold is set to a value larger than a cell voltage at which it can be determined that deterioration of the fuel cell progresses. In other words, with the present invention, it is possible to quickly establish the idling stop state again by cancelling idling stop prior to an abundance of generated water and nitrogen accumulating in the fuel cell during idling stop.

For example, in a case of the cell voltage declining until falling below the cell voltage at which it can be determined that deterioration of the fuel cell progresses, and then cancelling idling stop, it is considered that an abundance of generated water and nitrogen have already accumulated in the fuel cell during cancellation; therefore, it is considered that time is required until discharging this generated water and nitrogen and establishing the idling stop state again. In contrast, in the present invention, the time after cancellation until establishing the idling stop state again can be shortened by frequently cancelling idling stop; therefore, it is possible to set the fuel cell to the idling stop state over a longer time period as a result.

In this case, it is preferable for the discharge valve control means to open the discharge valve over a predetermined time immediately after the idling stop was cancelled.

In a case of the cell voltage declining to the discharge valve open threshold during idling stop, it is considered that a certain amount of generated water and nitrogen have already accumulated. With the present invention, it is possible to maintain the idling stop state over a long time period, when the accumulated generated water and nitrogen are effectively discharged by opening the discharge valve immediately after cancellation of idling stop, and the idling stop state is established again.

In this case, it is preferable for the discharge valve to include at least any of a purge valve that mainly discharges a gaseous component of the residue inside of the anode system and a drain valve that mainly discharges a liquid component in the residue inside of the anode system.

With the present invention, it is possible to suppress a decline in the cell voltage caused by a rise in the nitrogen concentration, and to maintain the idling stop state longer, by opening and closing a purge valve for discharging a gaseous component at a period such as that described above. In addition, it is possible to suppress a decline in the cell voltage caused by the occurrence of flooding and to maintain the idling stop state longer, by opening and closing a drain valve for discharging a liquid component at a period such as that described above.

DETAILED DESCRIPTION OF THE INVENTION

First Embodiment

Figure 1:
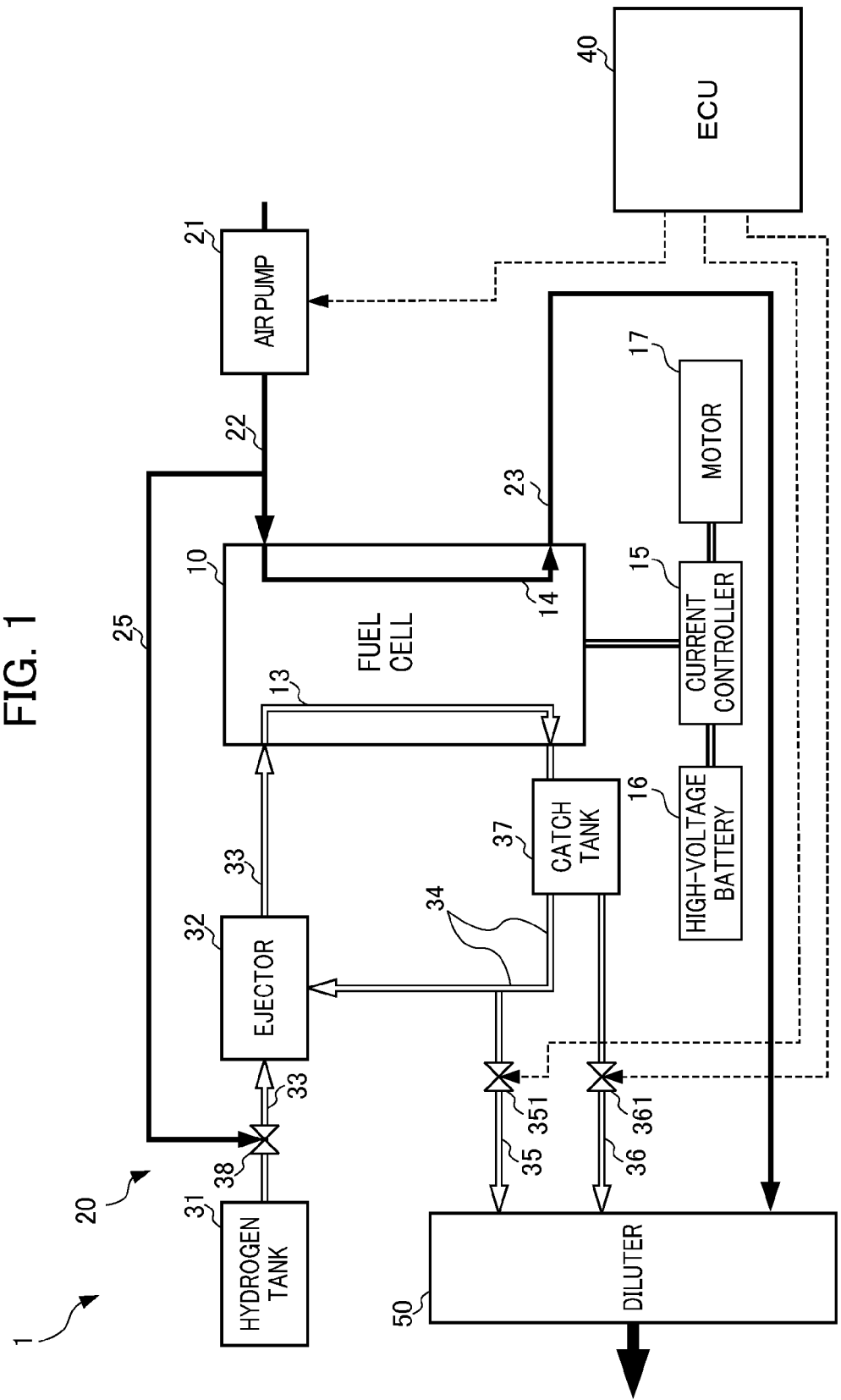
FIG. 1 is a block diagram of a fuel cell system according to a first embodiment of the present invention.

Hereinafter, a first embodiment of the present invention will be explained while referencing the drawings. FIG. 1 is a block diagram of a fuel cell system 1 according to the present embodiment.

The fuel cell system 1 includes a fuel cell stack 10, a supply device 20 that supplies hydrogen gas as fuel gas and air as oxidant gas to this fuel cell stack 10, and an electronic control unit (hereinafter referred to as "ECU") 40 that controls this supply device 20.

This fuel cell system 1 is equipped to a fuel cell vehicle (not illustrated) that travels using the electric power generated by the fuel cell stack 10 to drive the motor 17.

The fuel cell stack (hereinafter simply referred to as "stack") 10 is a stack structure in which from several tens to several hundreds of cells are stacked. Each fuel cell is configured by sandwiching a membrane electrolyte assembly (MEA) with a pair of separators. The membrane electrode assembly is configured by the two electrodes of an anode and a cathode, and a solid polymer electrolyte membrane sandwiched by these electrodes. Usually, both electrodes are formed from a catalyst layer contacting the solid polymer electrolyte membrane and carrying out oxidation and reduction reactions, and a gas diffusion layer contacting this catalyst layer. When hydrogen gas is supplied to the anode channel 13 formed on the anode side thereof and air containing oxygen is supplied to a cathode channel 14 formed on the cathode side thereof, this stack 10 generates power by way of the electrochemical reaction between these.

The supply device 20 is configured to include an air pump 21 that supplies air to the cathode channel 14 of the stack 10, a hydrogen tank 31 that stores hydrogen gas, and an ejector 32 that supplies hydrogen gas in the hydrogen tank 31 to the anode channel 13 of the stack 10.

The air pump 21 is connected to one end side of the cathode channel 14 of the stack 10 via an air supply line 22. An air discharge line 23 is connected to the other end side of the cathode channel 14 of the stack 10, and a diluter 50 as a dilution means, which will be described later, is connected to a leading end side of this air discharge line 23. Furthermore, a back-pressure valve (not illustrated) that controls the pressure inside the cathode channel 14 of the stack 10 is provided in this air discharge line 23.

The hydrogen tank 31 is connected to one end side of the anode channel 13 of the stack 10 via a hydrogen supply line 33. The ejector 32 is provided to this hydrogen supply line 33. In addition, a shutoff valve (not illustrated) and a regulator 38 that reduce the pressure of the hydrogen gas supplied from the hydrogen tank 31 are provided in the hydrogen supply line 33 between the hydrogen tank 31 and the ejector 32. This regulator 38 has a channel 25 branching from the air supply line 22 connected thereto, and with the pressure inside the air supply line 22 serving as a signal pressure, controls the hydrogen gas pressure by opening or closing depending on the level of this signal pressure. More specifically, when the pressure inside of the air supply line 22 rises, the regulator 38 operates to the opening side in order to raise the hydrogen gas pressure to match this.

A hydrogen recirculation line 34 is connected to the other end side of the anode channel 13 of the stack 10. The leading end side of this hydrogen recirculation line 34 is connected to the ejector 32. The ejector 32 recovers hydrogen gas flowing through the hydrogen recirculation line 34, and recirculates this to the hydrogen supply line 33.

An anode off-gas discharge line 35 is provided to branch from the hydrogen recirculation line 34. The diluter 50 is connected to a leading end side of this anode off-gas discharge line 35. A purge valve 351 that opens and closes this anode off-gas discharge line 35 to discharge hydrogenous gas flowing through the hydrogen recirculation line 34 to the diluter 50 is provided in the anode off-gas discharge line 35. It should be noted that the detailed procedure of purge control to open and close this purge valve 351 at the appropriate timing will be described in detail later.

In addition, a catch tank 37 that stores the generated water from power generation discharged along with a gaseous component from the anode channel 13 is provided to this hydrogen recirculation line 34. This catch tank 37 and diluter 50 are connected by a generated water discharge line 36. A drain valve 361 that discharges the generated water stored in the catch tank 37 to the diluter 50 is provided in the generated water discharge line 36. It should be noted that the detailed procedure of drain control to open and close this drain valve 361 at the appropriate timing will be described in detail later.

The diluter 50 dilutes hydrogenous gas discharged from the stack 10 via the anode off-gas discharge line 35 and generated water discharge line 36, with air introduced via the air discharge line 23 as dilution air. More specifically, the diluter 50 introduces hydrogenous gas into a retention chamber via the anode off-gas discharge line 35 and generated water discharge line 36 along with nitrogen and generated water, by opening the purge valve 351 and drain valve 361, and releases the gas in this retention chamber to outside the system while gradually diluting with the dilution air successively introduced from the air discharge line 23.

In the present embodiment, the anode system in which gas supplied to the anode channel 13 of the stack 10 and gas discharged from the anode channel 13 flow through is configured by the hydrogen supply line 33, hydrogen recirculation line 34, anode off-gas discharge line 35, and generated water discharge line 36. In addition, the cathode system in which gas supplied to the cathode channel 14 of the stack 10 and gas discharged from the cathode channel 14 flow through is configured by the air supply line 22 and air discharge line 23. FIG. 1 illustrates the anode system with white arrows, and illustrates the cathode system with solid black arrows.

In addition, the stack 10 is connected to the high-voltage battery 16 and a motor 17 via a current controller 15. The high-voltage battery 16 stores electric power generated by the stack 10, and applies this as appropriate such as during the startup of the stack 10. This high-voltage battery 16 is configured by a rechargeable battery such as a lithium-ion battery, or capacitors, for example. The current controller 15 is configured to include a DC/DC converter, and controls the generated electric current (hereinafter referred to as "FC current") produced from the stack 10 based on a current command value decided by the ECU 40. The motor 17 rotates the drive wheels, which are not illustrated, by way of the electric power generated by the stack 10 and the electric power of the high-voltage battery 16.

In the fuel cell system 1 configured as described above, the air pump 21 for controlling the supplied amount of air to the stack 10, the purge valve 351 for introducing gas in the anode system to the diluter 50, the drain valve 361 for introducing generated water inside of the catch tank 37 to the diluter 50, and the current controller 15 for controlling the FC current are controlled by the ECU 40.

Next, specific procedures of purge control, drain control and idling stop control of the fuel cell system by the ECU will be explained while referencing FIGS. 2 to 10.

Figure 2:
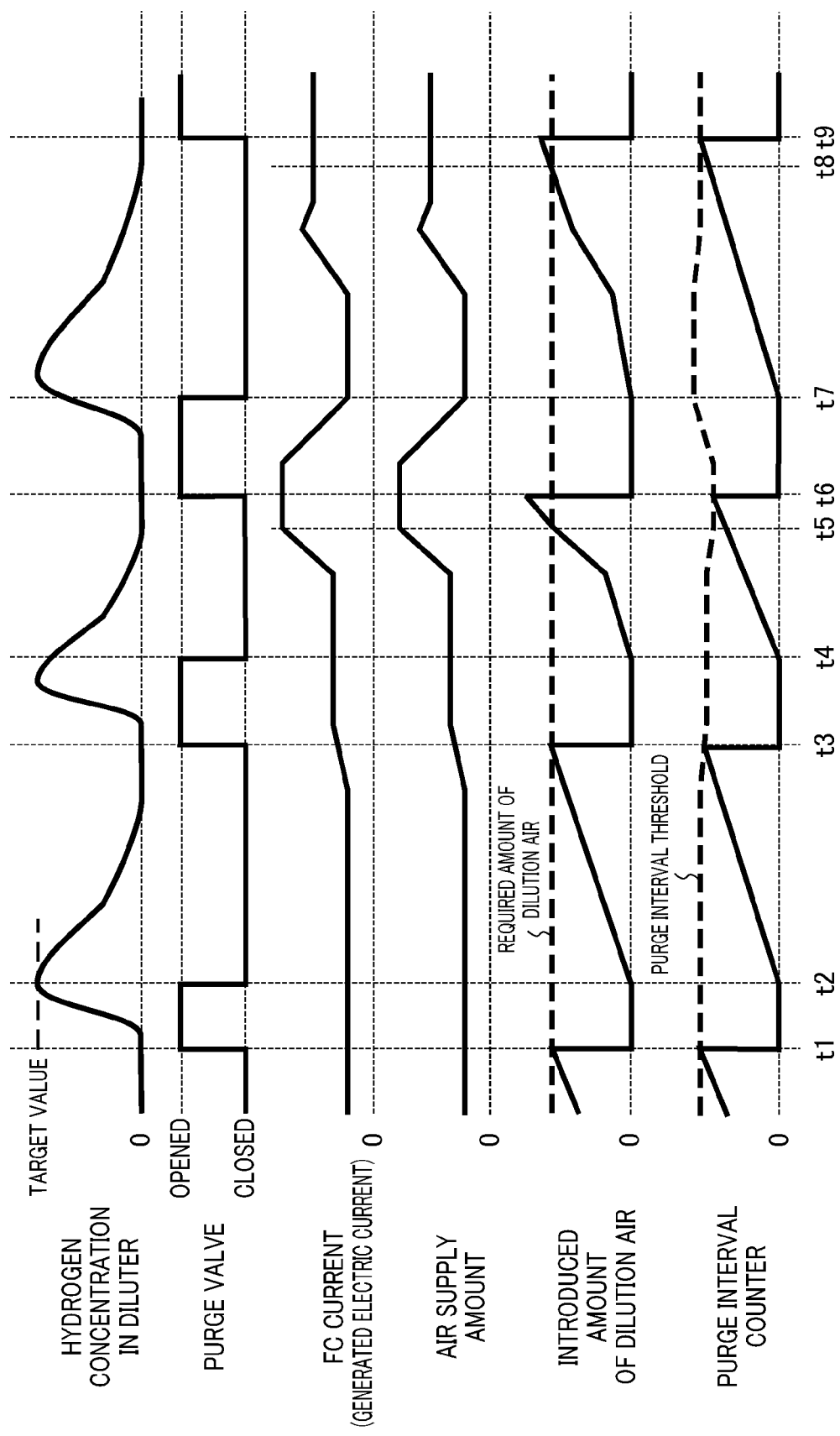
FIG. 2 is a time chart showing an example of purge control during normal power generation of a stack.

FIG. 2 is a time chart showing an example of a procedure of purge control. More specifically, it is a time chart showing an example of purge control during normal power generation of the stack. Herein, normal power generation of the stack refers to a state of controlling FC current in response to a request for acceleration or deceleration from the driver, in order to drive the motor to travel using the electric power generated by the stack.

As shown in FIG. 2, while the stack is in the normal power generation state, the supplied amount of air to the stack fluctuates in response to requests for acceleration or deceleration from the driver, and the FC current also fluctuates to match this fluctuation in the supplied amount of air to the stack. It should be noted that, during normal power generation in which the supply amount of air fluctuates and consequently the FC current fluctuates in response to the requests of the driver in this way, a state in which the supplied amount of air is minimized due to the fuel cell vehicle temporarily stopping or the like is referred to as a state of idling power generation, in order to distinguish from the state of idling stop described later.

While the stack is in normal power generation, the ECU determines whether or not valve opening of the purge valve is permitted and determines whether or not valve opening of the purge valve is requested, and opens the purge valve over a predetermined valve open time only when valve opening of the purge valve is permitted and being requested. Hereinafter, the specific procedure of purge valve opening permission determination and purge valve opening request determination will be explained.

For example, as shown at time t1 to t2 in FIG. 2, since hydrogen gas is also introduced into the diluter along with nitrogen staying in the anode system when the purge valve is open, the hydrogen concentration inside of the diluter temporarily rises. Subsequently, the hydrogen concentration inside of the diluter gradually declines due to the dilution air newly introduced into the diluter when the purge valve is closed. Herein, in order to configure so that gas with a high hydrogen concentration is not discharged to outside the system, the target value for the hydrogen concentration in the diluter is set depending on the performance thereof.

The ECU permits opening of the purge valve in a case of being able to determine that the hydrogen concentration inside of the diluter will not far exceed the above-mentioned target value even if the purge value is opened. More specifically, the ECU calculates a dilution air introduction amount corresponding to the integrated quantity of dilution air newly introduced into the diluter since closing the purge valve, and in a case of this dilution air introduction amount being less than a dilution air required amount determined in advance, determines that the hydrogen in the diluter is not sufficiently diluted and inhibits opening of the purge valve, and in a case of the dilution air introduction amount being at least the dilution air required amount, permits opening of the purge valve (refer to times t3, t5 and t8 in FIG. 2). It should be noted that this dilution air introduction amount is calculated by integrating the FC current value, which is substantially proportional to the amount of air supplied to the diluter, for example.

In addition, the ECU requests opening of the purge valve in a case of being able to determine that the nitrogen concentration in the anode system has increased a certain extent. More specifically, the ECU measures a purge interval counter corresponding to the elapsed time since closing the purge valve, and in a case of this purge interval counter being less than a predetermined purge interval threshold, determines it unnecessary to open the purge valve, while in a case of the purge interval counter being at least the purge interval threshold, determines it necessary to open the purge valve. It should be noted that the purge interval threshold for determining the request for opening the purge valve is set according to a predetermined map so as to decrease as the FC current value increases (refer to dotted line in FIG. 7 described later).

The ECU determines purge valve opening permission and opening request as described above, and when opening of the purge valve is permitted and requested (refer to times t1, t3, t6 and t9 in FIG. 2), opens the purge valve over a predetermined valve opening time. It should be noted that this purge valve opening time (refer to time t1 to t2, t3 to t4, and t6 to t7 in FIG. 2) is set according to a predetermined map so as to lengthen as the FC current value increases (refer to dotted line in FIG. 8 described later).

Purge control during normal power generation of the stack has been explained above while referencing FIG. 2; however, since drain control is also performed by a similar procedure, a detailed explanation thereof will be omitted. In other words, since hydrogen gas is also introduced into the diluter along with the generated water when the drain valve is opened, similarly to the purge control, the drain valve is opened over a predetermined valve open time when valve opening of the drain valve is permitted and requested, so that the hydrogen concentration inside of the diluter does not far exceed the above-mentioned target value.

Figure 3:
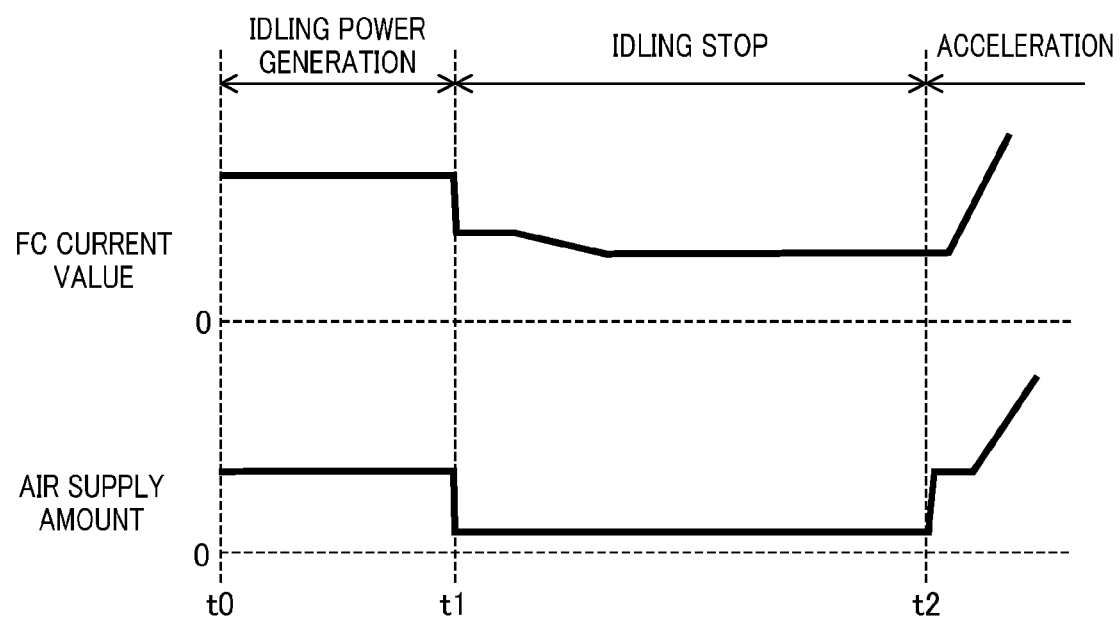
FIG. 3 is a time chart showing an example of a procedure of idling stop control.

FIG. 3 is a time chart showing an example of the procedure of idling stop control of the fuel cell system by the ECU. More specifically, it is a time chart showing changes in the FC current value and air supply amount, and the like in a period after temporarily stopping from a state in which the fuel cell vehicle is in motion, at time t0 to wait at a traffic signal or the like, for example, until initiating travelling again in response to an acceleration request from the driver at time t2.

After the vehicle temporarily stops and the stack enters the aforementioned state of idling power generation by the supplied amounts of air and hydrogen gas to the stack being decreased in response thereto (refer to time t0), the ECU sets the stack from the state of idling power generation to the state of idling stop in response to a predetermined idling stop initiation condition having been satisfied (refer to time t1). More specifically, the stack is set to the state of idling stop by decreasing both the revolution speed of the air pump, which is proportional to the supplied amount of air to the stack, and the FC current to less than during idling power generation within a range larger than 0. Thereafter, the ECU causes the revolution speed of the air pump to rise as needed in response to the predetermined idling stop cancellation condition having been satisfied (refer to time t2).

Herein, although the event of dilution air of a predetermined amount having been introduced into the diluter can be exemplified as the idling stop initiation condition, for example, it is not limited thereto. In addition, although the event of an acceleration request originating from the driver and the event of the cell voltage having fallen below a predetermined idling stop cancellation threshold (refer to FIG. 8 described later) can be exemplified as the idling stop cancellation condition, for example, it is not limited thereto. Furthermore, the stack may deteriorate if power generation is continued in a state in which the cell voltage is excessively low as mentioned above. Therefore, in order to suppress the stack from deteriorating during idling stop, the idling stop cancellation threshold for determining cancellation of the above-mentioned idling stop is set to a value on the order for which it is considered that deterioration of the stack may progress if the cell voltage declines further thereto.

In addition, the generated electric current produced from the stack during idling power generation and idling stop, which do not require driving the motor, is supplied to the high-voltage battery, is supplied to the air pump, or is supplied to a discharge resistor provided independently from the these loads, for example.

Figure 4:
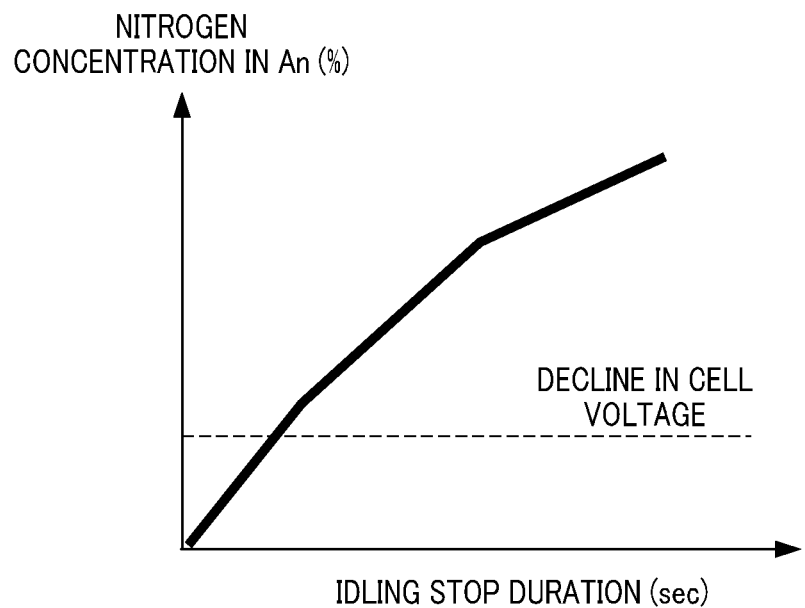
FIG. 4 is a graph showing a relationship between an idling stop duration and a nitrogen concentration in the anode system.

FIG. 4 is a graph showing the relationship between the idling stop duration and the nitrogen concentration in the anode system.

Figure 5:
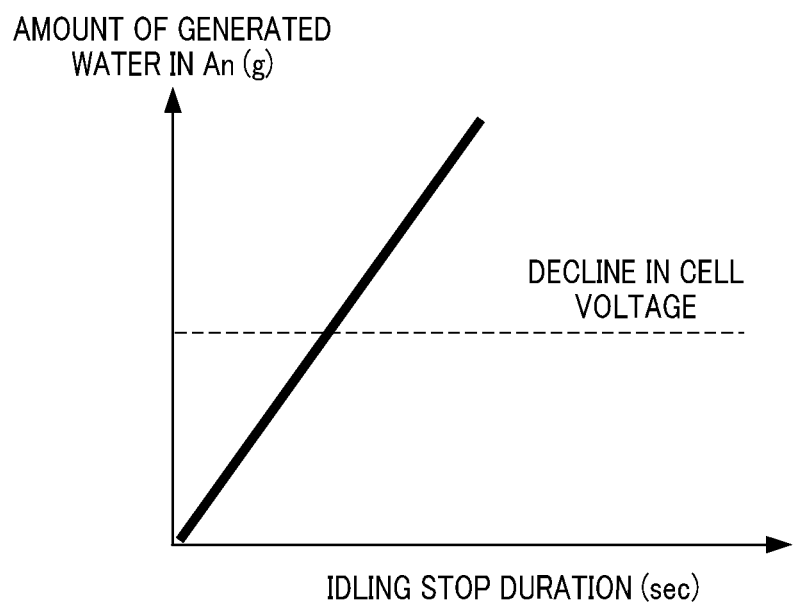
FIG. 5 is a graph showing a relationship between an idling stop duration and an amount of generated water in the anode system.

FIG. 5 is a graph showing the relationship between the idling stop duration and the amount of generated water in the anode system. It should be noted that, in FIGS. 4 and 5, the idling stop duration indicates the time for which a state of idling stop is continued without opening the purge valve and drain valve.

As shown in FIG. 4, the nitrogen concentration in the anode system increase as the idling stop duration lengthens, due to crossover from the cathode side to the anode side. In addition, during idling stop, the cell voltage starts to decline when the nitrogen concentration in the anode system exceeds a threshold such as that shown by the dotted line in FIG. 4. It should be noted that, since the difference between the nitrogen partial pressure on the cathode side and the nitrogen partial pressure on the anode side decreases when the nitrogen concentration in the anode system increases, the increase in the nitrogen concentration becomes more gradual as the idling stop duration lengthens.

In addition, the amount of generated water also increases during idling stop as described above, since air is supplied, albeit in a small quantity, and power generation by the stack is continued. As a result, in a case of the FC current value during idling stop being made constant, the amount of generated water will increase in a fixed ratio proportional to the idling stop duration, as shown in FIG. 5. In addition, during idling stop, the cell voltage starts to decline when the amount of generated water in the anode system exceeds a threshold such as that shown by the dotted line in FIG. 5.

In a case of the purge valve and the drain valve not having been opened during idling stop, both the nitrogen concentration and the amount of generated water in the anode system will increase, and the cell voltage with decline, as described above. Therefore, in the present embodiment, in order to maintain the state of idling stop over a long time period, purge control and drain control are executed during idling stop in procedures differing from the procedures during the normal power generation (including during idling power generation) explained while referencing FIG. 2. Hereinafter, the procedures of purge control and drain control during idling stop will be specifically explained.

Figure 6:
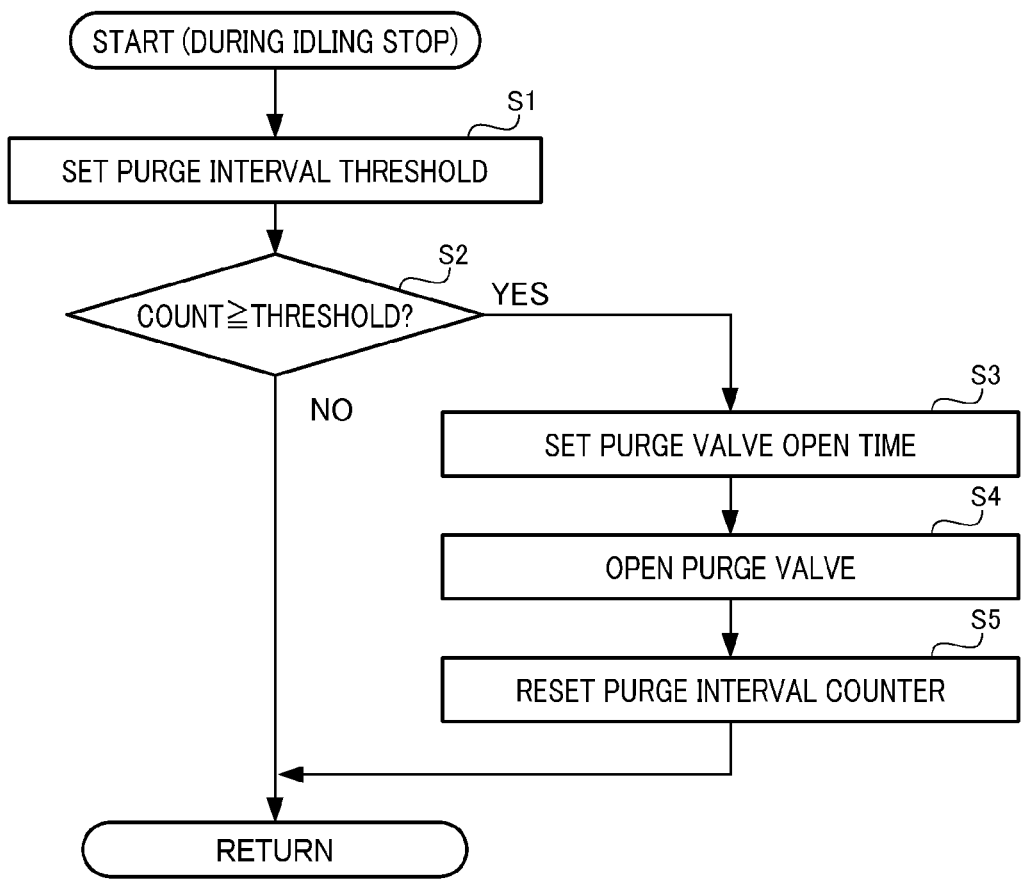
FIG. 6 is a flowchart showing a procedure of purge control during idling stop.

FIG. 6 is a flowchart showing the procedure of purge control during idling stop. The processing shown in FIG. 6 is repeatedly executed every predetermined control cycle by the ECU while an idling stop flag is set to "1", indicating being in a state in which setting to idling stop is being requested. It should be noted that this idling stop flag is set from "0" to "1" in response to the aforementioned idling stop initiation condition having been satisfied, by way of processing that is not illustrated, after which it is reset from "1" to "0" in response to the aforementioned idling stop cancellation condition having been satisfied.

Figure 7:
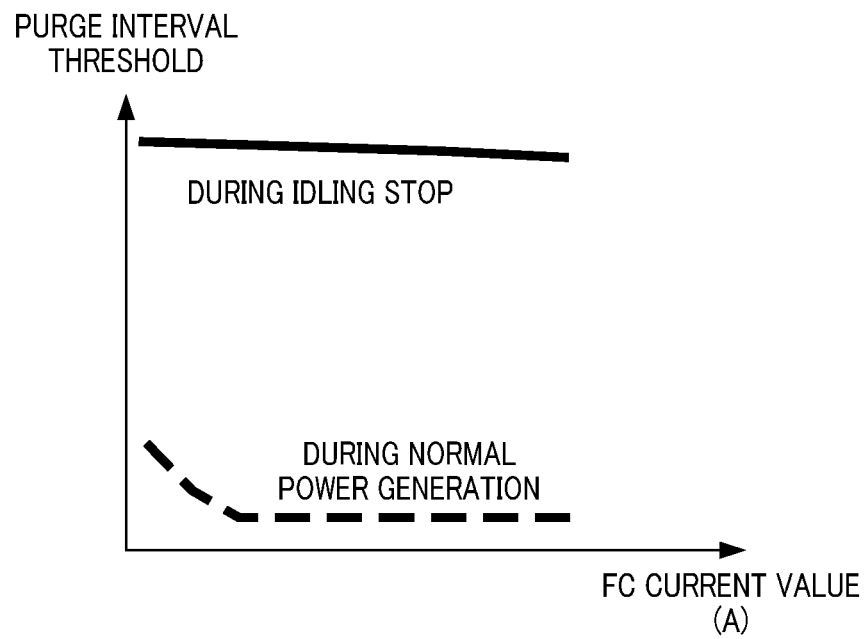
FIG. 7 is a graph showing an example of a map for setting a purge interval threshold during idling stop.

In Step S1, the purge interval threshold corresponding to a time period from closing until opening the purge valve (hereinafter referred to as "purge interval") is set by searching a predetermined map based on the FC current value, and then the processing advances to Step S2. FIG. 7 is a graph showing an example of a map for setting the purge interval threshold during idling stop.

It should be noted that, for comparison, FIG. 7 illustrates the map for setting the purge interval threshold during normal power generation by the dotted line. As shown in FIG. 7, the purge interval threshold is set to a smaller value accompanying the FC current value increasing. In addition, since during idling stop the supplied amount of air is further decreased to less than during idling power generation as described above, the purge interval threshold is set to a larger value compared to during idling power generation.

Referring back to FIG. 6, in Step S2, it is determined whether or not the purge interval counter is at least the purge interval threshold, i.e. whether or not the time period corresponding to the purge interval threshold set in the above-mentioned Step S1 has elapsed since last closing the purge valve. In the case of this determination being NO, it is determined that there is no necessity to open the purge valve, and this processing is terminated.

Figure 8:
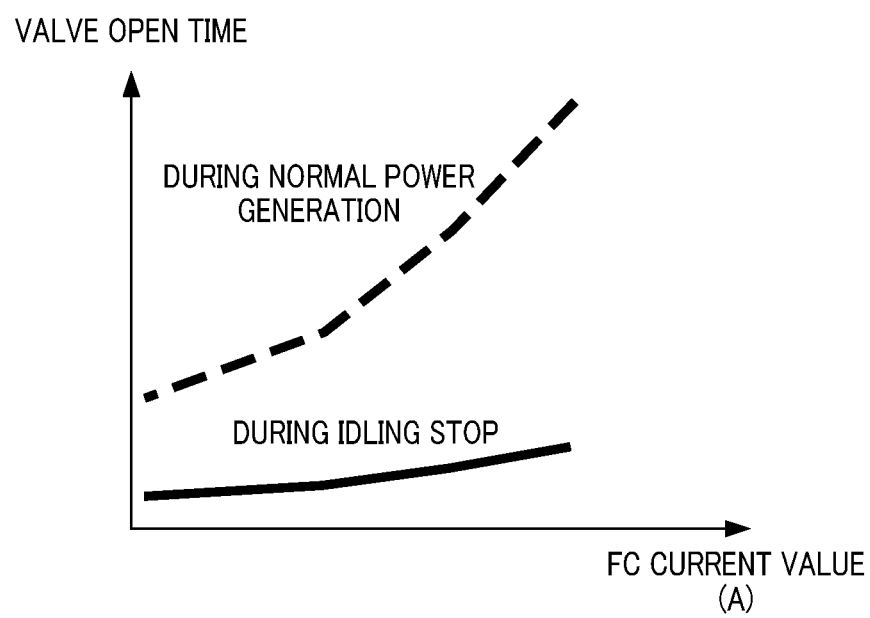
FIG. 8 is a graph showing an example of a map for setting a purge valve open time during idling stop.

In a case of the determination in Step S2 being YES, it is determined that there is a necessity to open the purge valve, and the processing advances to Step S3. In Step S3, the purge valve open time is set by searching a predetermined map based on the FC current value, and then the processing advances to Step S4. FIG. 8 is a graph showing an example of a map for setting the purge valve open time during idling stop.

It should be noted that, for comparison, FIG. 8 illustrates an example of a map for setting the purge valve open time during normal power generation by the dotted line. As shown in FIG. 8, the purge valve open time is set so as to lengthen accompanying the FC current value increasing. In addition, since during idling stop the supplied amount of air is further decreased to less than during idling power generation as described above, the valve open time during idling stop is set to be shorter than the valve open time during idling power generation.

In Step S4, the purge valve is opened over the valve open time set in the above-mentioned Step S3, and in Step S5, the purge interval counter is reset to "0", after which this processing is terminated.

Figure 9:
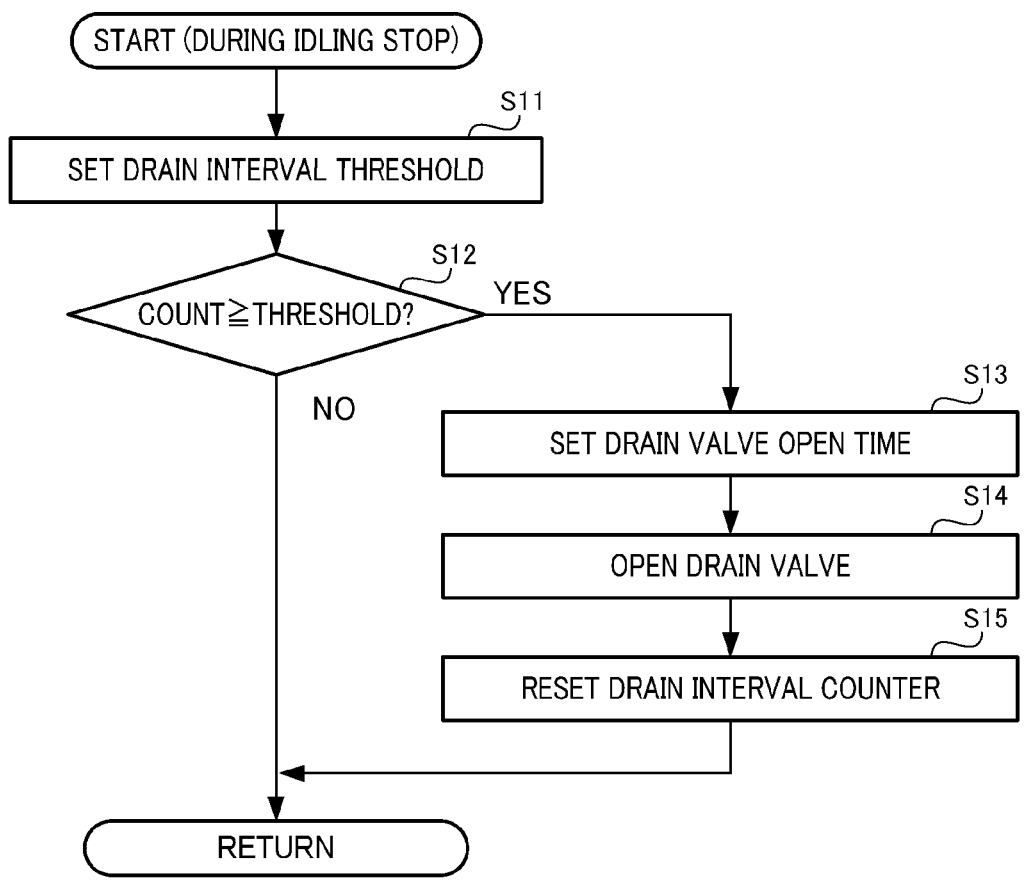
FIG. 9 is a flowchart showing a procedure of drain control during idling stop.

FIG. 9 is a flowchart showing the procedure of drain control during idling stop. The processing shown in FIG. 9 is repeatedly executed every predetermined control cycle by the ECU while the idling stop flag is set to "1", similarly to the purge control during idling stop explained while referencing FIG. 6.

In Step S11, a drain interval threshold corresponding to a time period from closing until opening the drain valve (hereinafter referred to as "drain interval") is set by searching a predetermined map based on the FC current value, and then the processing advances to Step S12. This drain interval threshold is set to a smaller value accompanying the FC current value increasing, similarly to the purge interval threshold explained while referencing FIG. 7. In addition, since during idling stop the supplied amount of air is further decreased to less than during idling power generation as described above, the drain interval threshold is set to a larger value compared to during idling power generation.

In Step S12, it is determined whether or not the drain interval counter is at least the drain interval threshold, i.e. whether or not the time period corresponding to the drain interval threshold has elapsed since last closing the drain valve. In the case of this determination being NO, it is determined that there is no necessity to open the drain valve, and this processing is terminated.

In a case of the determination in Step S12 being YES, it is determined that there is a necessity to open the drain valve, and the processing advances to Step S13. In Step S13, the drain valve open time is set by searching a predetermined map based on the FC current value, and then the processing advances to Step S14. This drain valve open time is set so as to lengthen accompanying the FC current value increasing, similarly to the purge valve open time explained while referencing FIG. 8. In addition, since during idling stop the supplied amount of air is further decreased to less than during idling power generation as described above, the valve open time during idling stop is set to be shorter than the valve open time during idling power generation.

In Step S14, the drain valve is opened over the valve open time set in the above-mentioned Step S13, and in Step S15, the drain interval counter is reset to "0", after which this processing is terminated.

Figure 10:
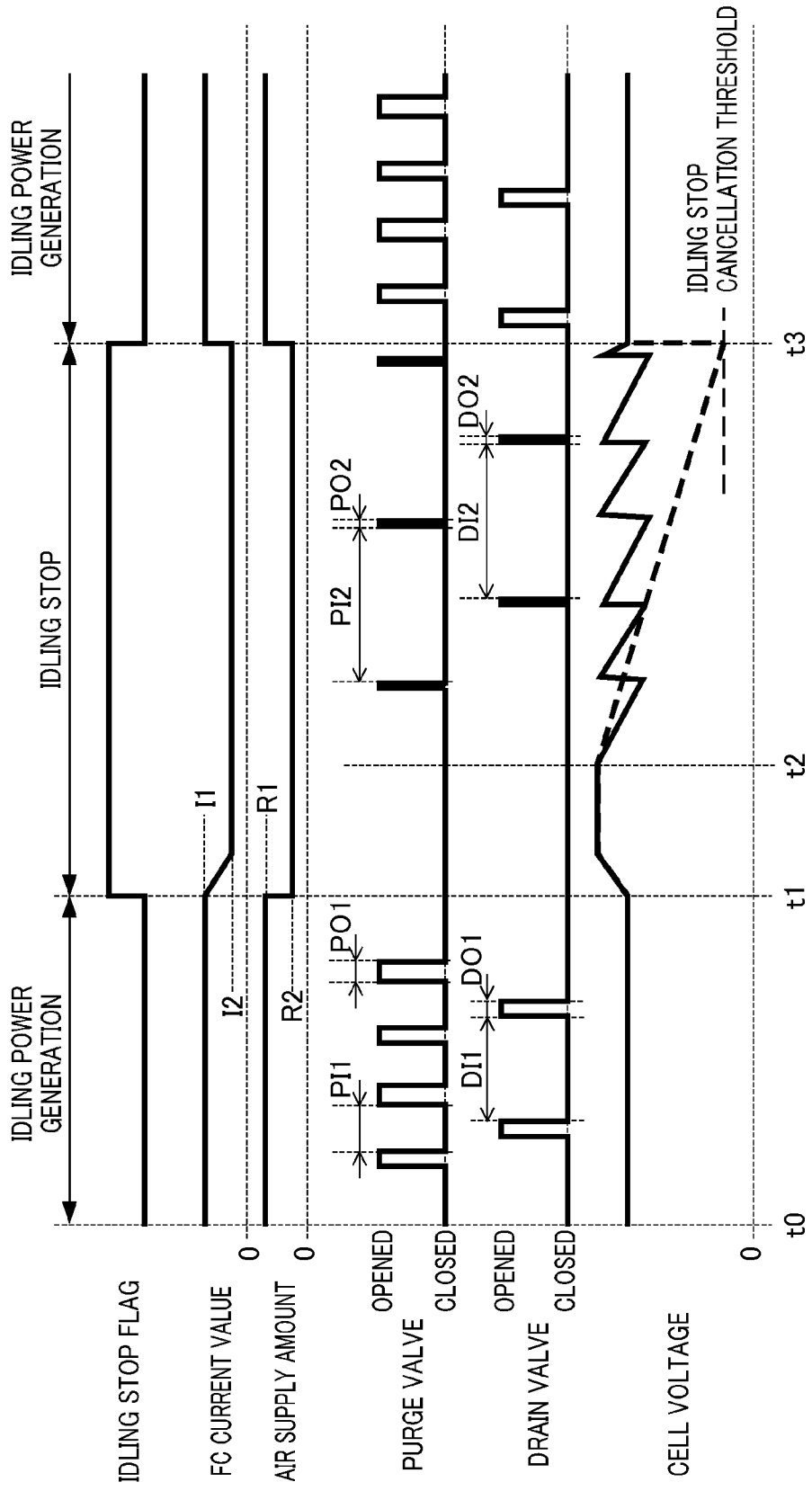
FIG. 10 is a time chart showing changes in the purge valve, drain valve and cell voltage during idling stop.

FIG. 10 is a time chart showing changes in the purge valve, drain valve and cell voltage serving as an indicator of the power generation stability of the stack, during idling stop. In addition, FIG. 10 shows a case of setting the stack in the idling stop state from time t1 and after, following the vehicle temporarily stopping and the stack entering the state of idling power generation at time t0. It should be noted that, for comparison, FIG. 10 illustrates the change in cell voltage in a case differing from the present embodiment of the purge valve and drain valve not having been opened during idling stop, by the dotted line.

First, the stack enters the idling power generation state at time t0 due to the vehicle temporarily stopping. FIG. 10 illustrates the supplied amount of air during idling power generation as R1 and the FC current value as I1. In addition, during idling power generation, purge control and drain control are executed according to the procedures explained while referencing FIG. 2. FIG. 10 illustrates the purge interval and drain interval during idling power generation in the period of time t0 to t1 as PI1 and DI1, respectively, and illustrates the valve open times of the purge valve and drain valve as PO1 and DO1, respectively.

Next, in response to a predetermined idling stop initiation condition having been satisfied at time t1, the supplied amount of air is made to decline from during idling power generation (R1→R2). At this time, the FC current value is also made to decline from that during idling power generation in conjunction with the supplied amount of air (I1→I2). The stack thereby is in the state of idling stop at time t1 and after.

Immediately after the stack is set to the state of idling stop at time t1, the cell voltage temporarily rises due to causing the FC current value to decline; however, the cell voltage starts to decline due to the nitrogen concentration and amount of generated water in the anode system increasing as described above (refer to time t2).

Herein, in a case of both the purge valve and the drain valve not having been opened during idling stop, the cell voltage will gradually decline and fall below the idling stop cancellation threshold as shown by the dotted line in FIG. 10 (refer to time t3), and the state of idling stop will be cancelled.

In contrast, in the present embodiment, the purge valve and the drain valve are opened in the procedure explained while referencing the flowcharts of FIGS. 6 and 9, during idling stop. In other words, since the supplied amount of air is decreased during idling stop, the valve open times PO2 and DO2 of the purge valve and drain valve during idling stop are shortened from the valve open times P01 and DO1 during idling power generation, and further, the purge interval PI2 and the drain interval DI2 during idling stop are lengthened from the purge interval PI1 and the drain interval DI1 during idling power generation. It is thereby possible to prevent the cell voltage from declining until falling below the idling stop cancellation threshold, and to maintain the idling stop state over a long time period, as shown in FIG. 10.

There are the following such effects according to the present embodiment.

(1) With the present embodiment, even during idling stop, the purge valve and the drain valve are opened over a predetermined valve open time to dilute the hydrogen gas discharged along with nitrogen and generated water by way of the dilution air. It is thereby possible to suppress a decline in cell voltage and to maintain the idling stop state over a long time period. With the present embodiment, it is configured so that hydrogen gas of an amount exceeding the dilution capability is not introduced to the diluter, by shortening the valve open times of the purge valve and the drain valve during idling stop to less than during idling power generation. Therefore, according to the present embodiment, it is possible to sufficiently dilute fuel gas, while maintaining the idling stop state longer.

(2) With the present embodiment, it is possible to introduce a sufficient amount of dilution air to the diluter in a period since last closing the purge valve and drain valve until the present reopening thereof, by lengthening the purge interval and drain interval during idling stop to longer than during idling power generation.

(3) With the present embodiment, by opening the purge valve in a case of the time period corresponding to the above-mentioned purge interval threshold having elapsed since closing the purge valve, or by opening the drain valve in a case of the time period corresponding to the above-mentioned drain interval threshold having elapsed since closing the drain valve, it is possible to open these valves at an appropriate timing at which it can be determined that a sufficient amount of dilution air has been introduced to the diluter, even during idling stop, which supplies a low flowrate of air.

(4) With the present embodiment, the valve open times of the purge valve and drain valve during idling stop are set based on the FC current value during idling stop. It is thereby possible to appropriately set the valve open times of the purge valve and the drain valve during idling stop in accordance with the dilution capability of the diluter.

(5) With the present embodiment, it is possible to suppress a decline in the cell voltage caused by a rise in the nitrogen concentration, and to maintain the idling stop state longer, by opening and closing the purge valve for an appropriate valve open time and purge interval such as those described above. In addition, it is possible to suppress a decline in the cell voltage caused by the occurrence of flooding and to maintain the idling stop state longer, by opening and closing the drain valve for an appropriate valve open time and drain interval such as those described above.

It should be noted that, in the above-mentioned embodiment, with the event of a time corresponding to the purge interval threshold having elapsed since closing the purge valve defined as the condition, it is determined that there is a necessity to discharge nitrogen in the anode system in a case of the present condition being satisfied during idling stop, and the purge valve is opened; however, the condition for opening the purge valve is not limited thereto. Furthermore, the purge valve may be opened with the event of the integrated value of FC current becoming at least a predetermined value as the condition, and the purge valve may be opened in a case of both of the two above-mentioned conditions having been satisfied.

In addition, in the above-mentioned embodiment, with the event of a time corresponding to the drain interval threshold having elapsed since closing the drain valve defined as the condition, it is determined that there is a necessity to discharge the generated water in the anode system in a case of the present condition being satisfied during idling stop, and the drain valve is opened; however, the condition for opening the drain valve is not limited thereto. Similarly to the above-mentioned valve opening condition for the purge valve, the drain valve may be opened with the event of the integrated value of FC current becoming at least a predetermined value as the condition, and the drain valve may be opened in a case of both of the two above-mentioned conditions having been satisfied.

Second Embodiment

Next, a second embodiment of the present invention will be explained while referencing the drawings. It should be noted that, in the following explanation, the same reference symbols are assigned for the same configurations as the first embodiment, and explanations thereof will be omitted.

Figure 11:
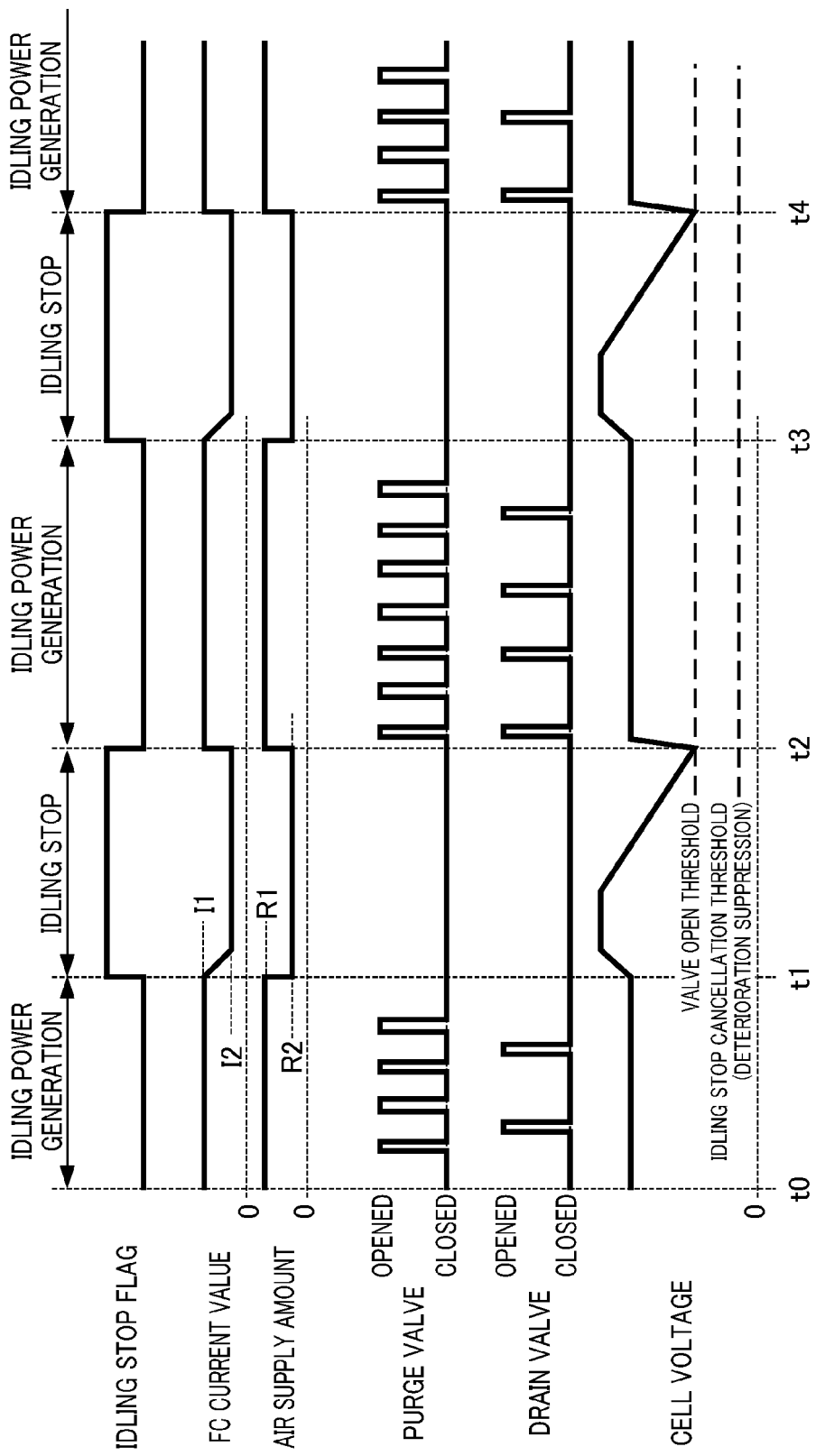
FIG. 11 is a time chart showing an example of a procedure of idling stop control of a fuel cell system according to a second embodiment of the present invention.

FIG. 11 is a time chart showing an example of the procedure of idling stop control of a fuel cell system by the ECU according to the present embodiment. In the present embodiment, the conditions for updating the idling stop flag, i.e. the idling stop initiation condition and idling stop cancellation condition, and the aspect of not opening the purge valve and drain valve during idling stop differ from the above-mentioned first embodiment.

In the present embodiment, with the event of a predetermined amount of dilution air having been introduced into the diluter after the stack having entered the idling power generation state due to the vehicle temporarily stopping defined as the idling stop initiation condition, the stack is set to the idling stop state from the idling power generation state in response to this idling stop initiation condition having been satisfied (refer to time t1). In addition, in the present embodiment, with the event of the total purge amount corresponding to the total amount of nitrogen discharged by opening the purge valve after idling stop cancellation exceeding a requested total purge amount described later, or the event of the total drain amount corresponding to a total amount of generated water discharged by opening the drain valve after idling stop cancellation exceeding a requested total drain amount described later defined as the idling stop initiation condition, the stack is set to the idling stop state again from the idling power generation state in response to this idling stop initiation condition having been satisfied, even after idling stop has been cancelled (refer to time t3). In this way, upon setting to the idling stop state again after the idling stop cancellation, it is possible to make the decline in the cell voltage when establishing idling stop again to be more gradual, by continuing idling power generation until the total purge amount after idling stop cancellation exceeds the requested total purge amount or the total drain amount exceeds the requested total drain amount, i.e. until nitrogen and generated water are sufficiently discharged; therefore, it is possible to maintain the idling stop state over a long time period.

Figure 12:
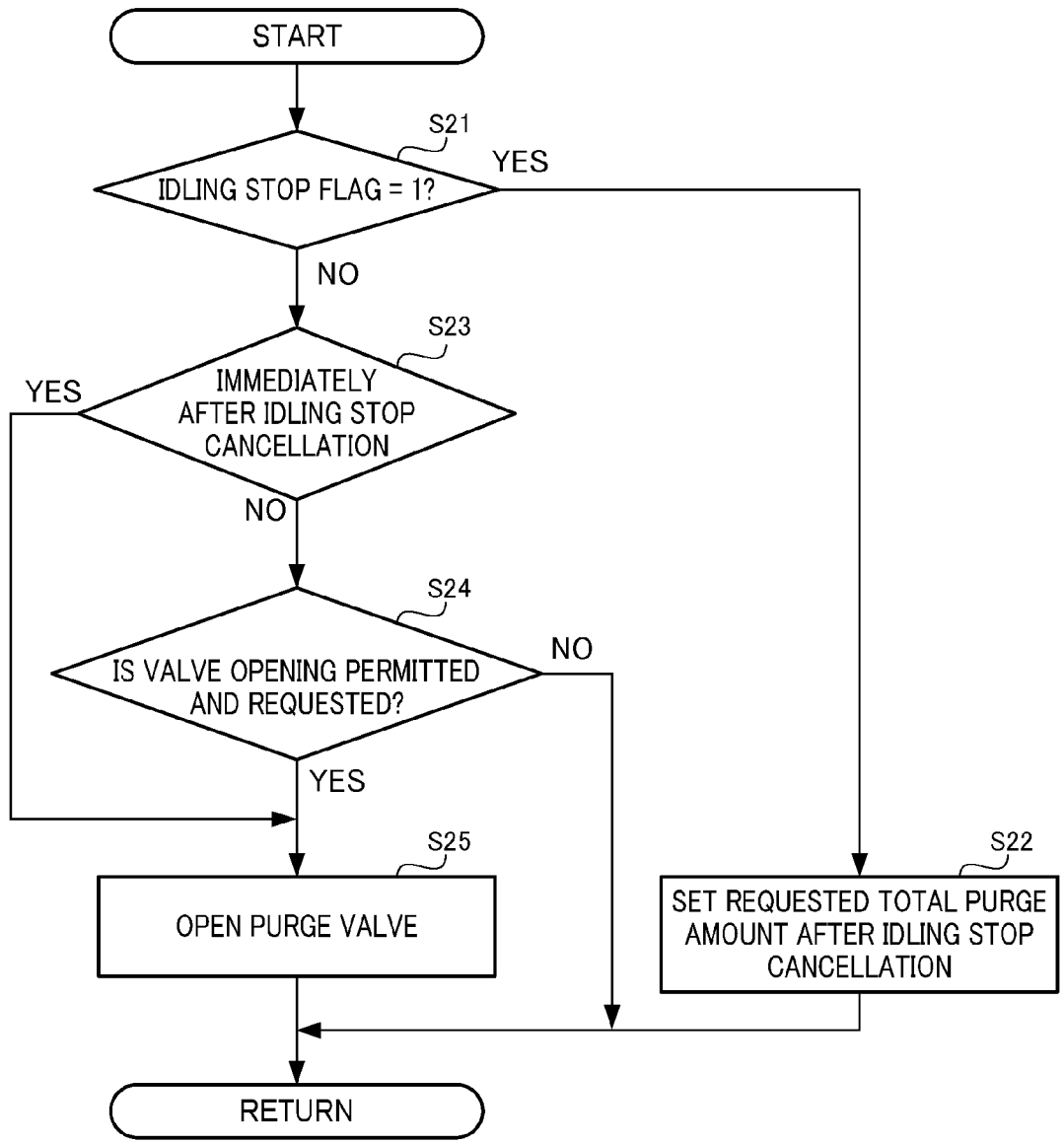
FIG. 12 is a flowchart showing a procedure of purge control.

In the present embodiment, with the event of an acceleration request originating from the driver during idling stop, the event of the cell voltage having fallen below a predetermined valve open threshold during idling stop, and the event of the idling stop duration exceeding a predetermined time limit defined as the idling stop cancellation condition, idling stop is cancelled in a case of any of these idling stop cancellation conditions being satisfied during idling stop (refer to times t2 and t4). Herein, as shown in FIG. 12, the valve open threshold related to the cell voltage is set to a larger value than the idling stop cancellation threshold set for suppressing deterioration of the stack as described above. In other words, in a case of there not being an acceleration request during idling stop, idling stop comes to be cancelled earlier in the present embodiment than in the above-mentioned first embodiment. In addition, the above-mentioned time limit related to the idling stop duration is set in advance according to tests, so that the stability of the stack during idling stop or immediately after idling stop cancellation can be ensured. In this way, by cancelling idling stop according to the idling stop duration, it is possible to cancel idling stop at an appropriate timing, even in a case such as the decline in the power generation stability of the stack during idling stop not being expressed as a decline in cell voltage; therefore, the time until entering the next idling stop after cancellation is shortened as much as possible, a result of which the time setting to idling stop can be lengthened.

The idling stop flag is set from "0" to "1" in a case of the aforementioned such idling stop initiation conditions having been satisfied, and is reset from "1" to "0" in a case of the idling stop cancellation condition having been satisfied.

FIG. 12 is a flowchart showing a procedure of purge control. The processing shown in FIG. 12 is repeatedly executed every predetermined control cycle by the ECU after an ignition switch (not illustrated) is turned on.

In Step S21, it is determined whether the idling stop flag is "1". In a case of this determination being YES, i.e. in a case of currently being during idling stop, the processing advances to Step S22, the requested total purge amount is calculated by searching a predetermined map based on the idling stop duration, after which this processing is terminated without opening the purge valve.

Figure 13:
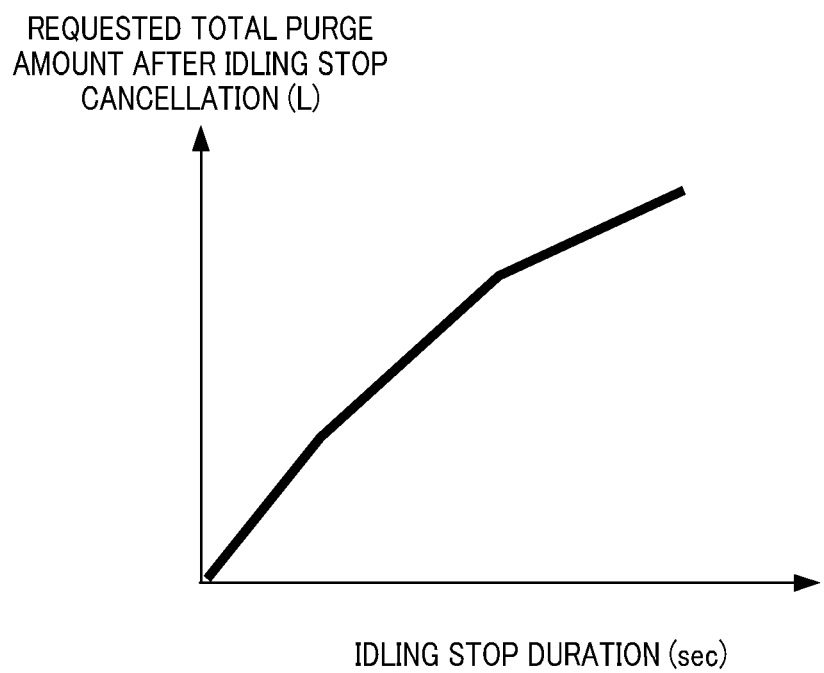
FIG. 13 is a graph showing an example of a map for setting a requested total purge amount after idling stop cancellation.

FIG. 13 is a graph showing an example of a map for setting the requested total purge amount after idling stop cancellation. Since the purge valve is not opened during idling stop in present embodiment as described above, the nitrogen concentration in the anode system after idling stop cancellation increases in proportion to the idling stop duration. As a result, the requested total purge amount is set so as to increase in proportion to the idling stop duration, as shown in FIG. 13.

In a case of the determination in Step S21 being NO, i.e. in a case of not currently being during idling stop, the processing advances to Step S23, and it is determined whether or not it is immediately after idling stop was cancelled. In the case of this determination being YES and currently being immediately after idling stop was cancelled, the processing advances to Step S25 and the purge valve is opened over a predetermined time period, after which this processing is terminated. In a case of the determination of Step S23 being NO and not being immediately after idling stop was cancelled, the processing advances to Step S24 in order to control the purge valve according to a procedure similar to the purge control during normal power generation explained while referencing FIG. 2 in the above-mentioned first embodiment.

In Step S24, it is determined whether opening of the purge valve is permitted and being requested. It should be noted that whether or not opening of the purge valve is permitted is determined by comparing between the dilution air introduction amount and the dilution air required amount, and whether or not opening of the purge valve is requested is determined by comparing between the purge interval counter and the purge interval threshold, as explained while referencing FIG. 2 in the first embodiment.

In a case of the determination of Step S24 being YES, the processing advances to Step S25, and this processing is terminated after the purge valve has been opened over a predetermined valve open time, and in a case of being NO, this processing is terminated without opening the purge valve.

Figure 14:
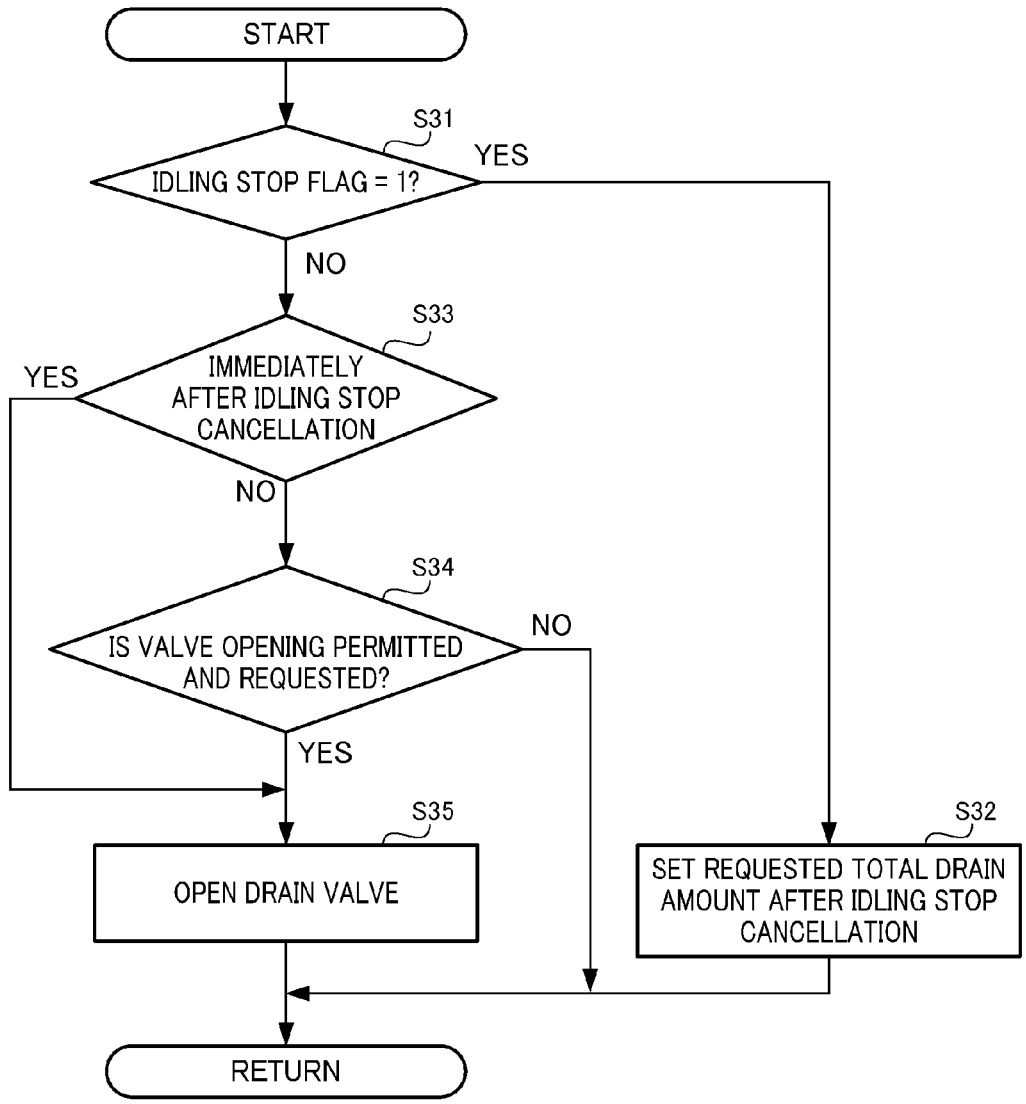
FIG. 14 is a flowchart showing a procedure of drain control.

FIG. 14 is a flowchart showing a procedure of drain control. The processing shown in FIG. 14 is repeatedly executed every predetermined control cycle by the ECU, after the ignition switch (not illustrated) is turned on.

In Step S31, it is determined whether or not the idling stop flag is "1". In a case of this determination being YES, i.e. in a case of currently being during idling stop, the processing advances to Step S32 and the requested total drain amount is calculated by searching a predetermined map based on the idling stop duration, after which this processing is terminated without opening the drain valve.

Figure 15:
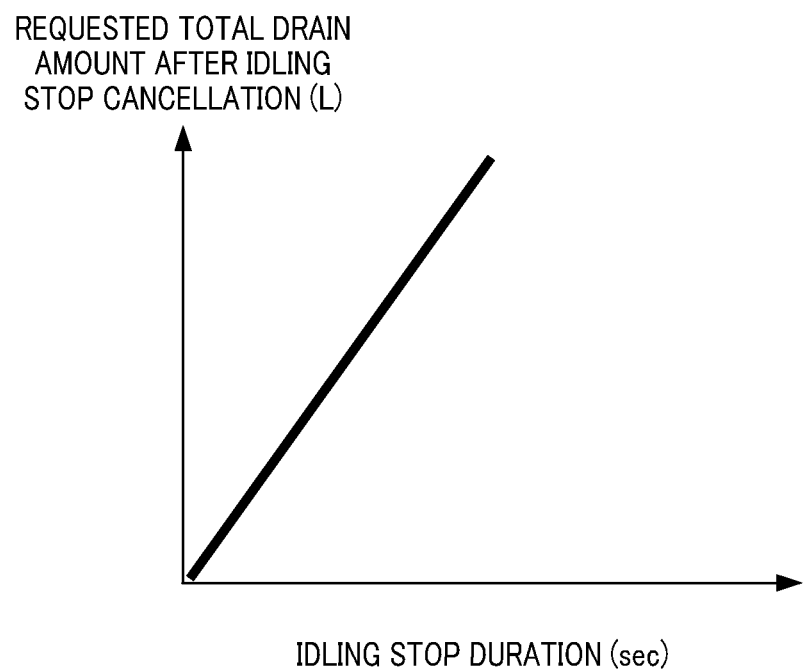
FIG. 15 is a graph showing an example of a map for setting a requested total drain amount after idling stop cancellation.

FIG. 15 is a graph showing an example of a map for setting the requested total drain amount after idling stop cancellation. Since the drain valve is not opened during idling stop in the present embodiment as described above, the amount of generated water in the anode system after idling stop cancellation increases in proportion to the idling stop duration. As a result, the requested total drain amount is set so as to increase in proportion to the idling stop duration, as shown in FIG. 15.

In a case of the determination in Step S31 being NO, i.e. in a case of not currently being during idling stop, the processing advances to Step S33, and it is determined whether or not being immediately after idling stop was cancelled. In a case of this determination being YES and currently being immediately after idling stop was cancelled, the processing advances to Step S35 and the purge valve is opened over a predetermined time period, after which this processing is terminated.

In a case of the determination of Step S33 being NO and not being immediately after idling stop was cancelled, the processing advances to Step S34 in order to control the drain valve according to a procedure similar to the drain control during normal power generation explained in the above-mentioned first embodiment. In Step S34, it is determined whether or not opening of the drain valve is permitted and being requested. In a case of the determination of Step S34 being YES, the processing advances to Step S35 and the drain valve is opened over a predetermined time period, after which this processing is terminated, and in a case of being NO, this processing is terminated without opening the drain valve.

There are the following such effects according to the present embodiment.

(6) With the present embodiment, idling stop is cancelled and the idling power generation state is established again in response to the cell voltage of the stack falling below the valve open threshold during idling stop. Furthermore, this valve open threshold is set to a value larger than the idling stop cancellation threshold, which corresponds to the cell voltage for which it can be determined that deterioration of the stack progresses. In other words, in the present embodiment, it is possible to quickly establish the idling stop state again by cancelling idling stop prior to an abundance of generated water and nitrogen accumulating in the stack during idling stop. For example, in a case of the cell voltage declining until falling below the above-mentioned idling stop cancellation threshold, and then cancelling idling stop, it is considered that an abundance of generated water and nitrogen have already accumulated in the stack during cancellation; therefore, it is considered that time is required until discharging this generated water and nitrogen and establishing the idling stop state again. In contrast, in the present embodiment, the time after cancellation until establishing the idling stop state again can be shortened by frequently cancelling idling stop; therefore, it is possible to set the stack to the idling stop state over a longer time period as a result.

(7) With the present embodiment, it is possible to maintain the idling stop state over a long time period, when the accumulated generated water and nitrogen are effectively discharged by opening the purge valve and drain valve immediately after cancellation of idling stop, and the idling stop state is established again.

It should be noted that the present invention is not to be limited to the above-mentioned embodiments, and that modifications, improvements, etc. within a scope that can achieve the object of the present invention are included in the present invention.

What is claimed is:

1. A fuel cell system comprising:
   a fuel cell that generates power when fuel gas is supplied to an anode and oxidant gas is supplied to a cathode;
   an electrical load that consumes electric power generated by the fuel cell;
   an idling stop control means for setting the fuel cell to an idling stop state by, in response to a predetermined condition being satisfied during idling power generation, decreasing both a supplied amount of oxidant gas to the fuel cell and generated electric current produced from the fuel cell to less than during the idling power generation, within a range greater than zero;
   a discharge valve provided in an anode system through which gas supplied to the anode and gas discharged from the anode flows;
   a dilution means for diluting fuel gas discharged from inside the anode system by opening the discharge valve, with oxidant gas serving as a dilution gas; and
   a discharge valve control means for determining whether there is a necessity to discharge residue inside of the anode system during the idling power generation and during the idling stop, and for opening the discharge valve over a predetermined time period in a case of there being a necessity,
   wherein the discharge valve control means shortens a valve open time of the discharge valve during the idling stop to less than a valve open time of the discharge valve during the idling power generation.

2. The fuel cell system according to claim 1, wherein a time from closing until opening the discharge valve is defined as a discharge interval, and
   the discharge valve control means lengthens a discharge interval during the idling stop to longer than a discharge interval during the idling power generation.

3. The fuel cell system according to claim 1, wherein the discharge valve control means determines there is a necessity to discharge residue inside of the anode system in a case of either one or both of two conditions having been satisfied of an event of a predetermined time elapsing since closing the discharge valve and an event of an integrated value of generated electric current produced from the fuel cell becoming at least a predetermined value, and then opens the discharge valve.

4. The fuel cell system according to claim 1, wherein a valve open time of the discharge valve during the idling stop is set based on a generated electric current of the fuel cell during the idling stop.

5. The fuel cell system according to claim 1, wherein the discharge valve includes at least any of a purge valve that mainly discharges a gaseous component of the residue inside of the anode system and a drain valve that mainly discharges a liquid component in the residue inside of the anode system.

6. A method for controlling a fuel cell system that includes:
   a fuel cell that generates power when fuel gas is supplied to an anode and oxidant gas is supplied to a cathode;
   an electrical load that consumes electric power generated by the fuel cell;
   a discharge valve provided in an anode system through which gas supplied to the anode and gas discharged from the anode flows; and
   a dilution means for diluting fuel gas discharged from inside of the anode system by opening the discharge valve, with oxidant gas as a dilution gas, the method comprising:
   an idling power generation step of producing a predetermined amount of generated electric current from the fuel cell while supplying a predetermined amount of oxidant gas to the fuel cell;
   an idling stop step of producing less generated electric current from the fuel cell than during the idling power generation step, while supplying a smaller amount of oxidant gas to the fuel cell than during the idling power generation step, initiated in response to a predetermined condition having been established while executing the idling power generation step; and
   a discharge step of determining whether there is a necessity to discharge residue inside of the anode system during the idling power generation step and during the idling stop step, and opening the discharge valve over a predetermined time period in a case of there being a necessity,
   wherein a valve open time of the discharge valve during the idling stop step is shortened to less than a valve open time of the discharge valve during the idling power generation step, in the discharge step.

7. The method for controlling a fuel cell system according to claim 6, wherein a time from closing until opening the discharge valve is defined as a discharge interval, and a discharge interval during the idling stop step is lengthened to longer than a discharge interval during the idling power generation step, in the discharge step.

8. The method for controlling a fuel cell system according to claim 6, wherein it is determined in the discharge step that there is a necessity to discharge residue inside of the anode system in a case of either one or both of two conditions having been satisfied of an event of a predetermined time elapsing since closing the discharge valve and an event of an integrated value of generated electric current produced from the fuel cell becoming at least a predetermined value, and the discharge valve is opened.

9. The method for controlling a fuel cell system according to claim 6, wherein a valve open time of the discharge valve during the idling stop step is set based on a generated electric current of the fuel cell during the idling stop step.

10. The method for controlling a fuel cell system according to claim 6, wherein the discharge valve includes at least any of a purge valve that mainly discharges a gaseous component of the residue inside of the anode system and a drain valve that mainly discharges a liquid component in the residue inside of the anode system.

11. A fuel cell system comprising:

a fuel cell that generates power when fuel gas is supplied to an anode and oxidant gas is supplied to a cathode;

an electrical load that consumes electric power generated by the fuel cell;

an idling stop control means for setting the fuel cell in an idling stop state by, in response to a predetermined condition being satisfied during idling power generation, decreasing both a supplied amount of oxidant gas to the fuel cell and generated electric current produced from the fuel cell to less than during the idling power generation, within a range greater than zero;

a discharge valve provided in an anode system through which gas supplied to the anode and gas discharged from the anode flows;

a dilution means for diluting fuel gas discharged from inside of the anode system by opening the discharge valve, with oxidant gas serving as a dilution gas; and a discharge valve control means for opening the discharge valve at a predetermined period over a predetermined time during the idling power generation, and for closing the discharge valve during the idling stop, wherein the idling stop control means cancels the idling stop in response to a cell voltage of the fuel cell during the idling stop falling below a discharge valve open threshold corresponding to a cell voltage at which it can be determined that there is a necessity to open the discharge valve, and establishes a state of idling power generation, and wherein the discharge valve open threshold is set to a value larger than a cell voltage at which it can be determined that deterioration of the fuel cell progresses.

12. The fuel cell system according to claim 11, wherein the discharge valve control means opens the discharge valve over a predetermined time immediately after the idling stop was cancelled.

13. The fuel cell system according to claim 11, wherein the discharge valve includes at least any of a purge valve that mainly discharges a gaseous component of the residue inside of the anode system and a drain valve that mainly discharges a liquid component in the residue inside of the anode system.

* * * * *